April 21, 1925.  1,534,748

M. TOCCHIO

OVEN, SAUCEPAN, AND THE LIKE

Filed Dec. 21, 1923

Inventor.

Michele Tocchio

Patented Apr. 21, 1925.

1,534,748

UNITED STATES PATENT OFFICE.

MICHELE TOCCHIO, OF LONDON, ENGLAND.

OVEN, SAUCEPAN, AND THE LIKE.

Application filed December 21, 1923. Serial No. 682,083.

*To all whom it may concern:*

Be it known that I, MICHELE TOCCHIO, an Italian subject, residing at 126 Dalling Road, in the county of London, W. 6, England, have invented new and useful Improvements in Ovens, Saucepans, and the like, of which the following is a specification.

This invention relates to improvements in ovens, saucepans and the like, and has for one of its objects to provide a combined oven with two, three or more removable saucepans, whereby the whole is heated simultaneously by one heating element.

A further object of my invention is to provide an oven in combination with two, three or more removable saucepans whereby each can be used separately, or the whole simultaneously.

My invention in the form of a combined oven and two, three or more removable saucepans, is constructed from metal having a casing with a door on the periphery, and a number of transverse bars, or grid, or a disc is secured at the base of the said casing. At the summit I provide bars or rods in a cross-wise or other formation according to the number of removable saucepans, and as hereinafter set forth where there are four removable saucepans, they will be at right angles to each other, which in turn receive and support the removable saucepans.

The aforesaid bars at the summit except the one terminating near the oven door, have an extension piece depending therefrom, each with a plurality of brackets projecting inwardly, and are secured to the interior of the casing, said brackets receive and support detachable shelves when my device is used as an oven.

Figure 1:
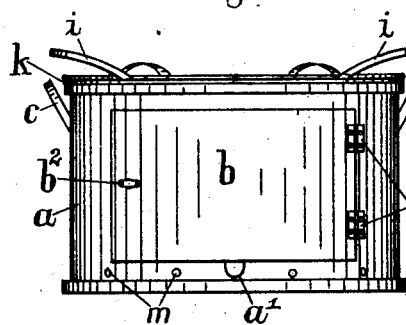
Figure 2:
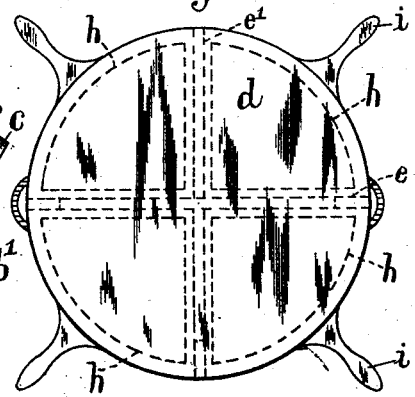
Figure 3:
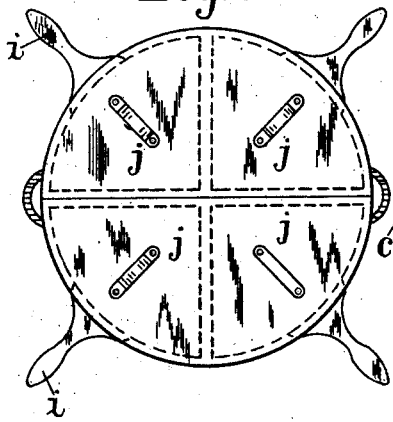

In the accompanying drawings Fig. 1, is a front elevation of the combined oven and removable saucepans; Fig. 2, is a bottom view of Fig. 1; Fig. 3, is a top view of Fig. 1, and Fig. 4, is a half sectional elevation of my device when the whole is in use.

My invention in the form of a combined oven and four removable saucepans, comprises a cylindrical or other shaped casing *a*, of metal with a door *b*, preferably of a large size mounted on hinges *b′*, and closed by an ordinary clip or latch *b*², in the usual manner, and handles *c*, are screwed or riveted diametrically opposite each other to the said casing *a*, for the purpose of lifting my device when required.

At the base of the casing *a*, I secure a disc *d*, by means of rivets and the like, and the heating appliance, is inserted inside the casing *a*, and means are provided to allow the supply of gas or the like to pass through the said casing *a*, by a slot *a′*, cut immediately beneath the door *h*, as shown in Fig. 1.

Figure 4:
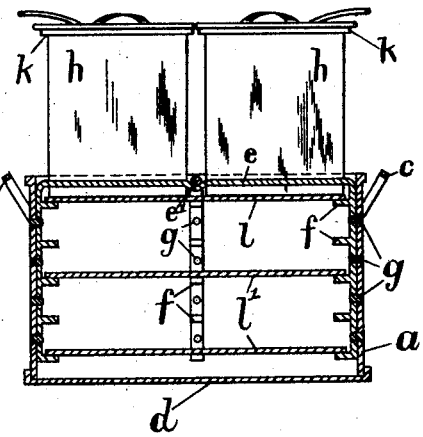

At the top of the casing *a*, I provide two bars *e*, and *e′*, and in the case where there are four removable saucepans, there are arranged in a cross-wise manner as shewn in Figs. 2, and 4, and the ends of the bars except the one at or near the oven door *b*, depend therefrom, and are integral with a plurality of brackets *f*, projecting radially inwards, secured to the interior of the casing *a*, by rivets *g*, and the like as shewn in Fig. 4. The four openings formed between the bars *e*, and *e′*, each receive a removable saucepan *h*, the latter in the form of a segment which may or may not taper slightly towards the base, but in either case a space or flue is provided between each of them and around their periphery to allow the heat to circulate all round each compartment; said saucepans *h*, each have a handle *i*, and are closed by a cover *j* of a corresponding configuration as shewn in Fig. 3.

Each of the aforesaid removable saucepans *h*, has a beading or rim *k*, to engage with the transverse bars *e*, and *e′*, and the top of the casing *a*, respectively as shewn in Fig. 1, whereby the top is closed when only the saucepans *h*, are being used.

My invention is adapted as an oven by means of the above described saucepans *h*, being first removed from the casing *a*, and a perforated grid *l*, of a suitable configuration in one or more parts to permit easy insertion is mounted on to the uppermost bracket *f*, being heated in the usual manner. Said saucepans *h*, are then replaced on to the grid *l*, which latter supports them in a manner as shewn in Fig. 4, and if any one or more of the saucepans *h*, are not required, the respective cover *j*, is replaced on to the rim of the casing *a*. Shelves *l′*, shewn in Fig. 4 are inserted into the casing *a*, which in turn are supported by the brackets *f*, as shewn in Fig. 4, for receiving and supporting food in the usual manner. Said shelves *l′* are perforated and may be if desired in one or two parts to allow easy insertion of same through the oven door $b$, which latter is of a comparatively large size.

At or near the base of the casing $a$, I provide a number of apertures $m$, if necessary to allow the proper ingress of air.

From the foregoing description it will be readily seen and understood that four different vegetables and a joint and the like can be cooked simultaneously by one ordinary heating element as hitherto used, for one receptacle, and any one or more of the saucepans can be removed without disturbing the others.

I claim:

1. A cooker comprising a casing, a door therefor, a disc at the base thereof, bars at the top of the casing and secured thereto, certain of said bars having depending ends formed with shelf-supporting brackets, said casing and bars adapted to support cooking utensils.

2. A cooker comprising a casing, with handles and a door therefor, a disc secured at the base, bars at the top of said casing and secured thereto, certain of said bars having depending ends, formed with shelf-supporting brackets, said casing and bars adapted to support cooking utensils, the latter having separate covers adapted to fit on and close the top of the casing when desired.

3. A cooker comprising a casing with handles, a door therefor, a disc secured to the base, bars at the top of said casing having depending ends riveted to the interior of said casing and formed with shelf-supporting brackets, said casing and bars adapted to support cooking utensils, each provided with a bead at the top, the utensils being spaced to form a flue between each cooking utensil and casing respectively, said cooking utensils having separate covers adapted to fit on and close the top of the casing when desired, said casing having apertures for proper ingress of air.

MICHELE TOCCHIO.